United States Patent [19]
Kazecki et al.

[11] Patent Number: 5,241,545
[45] Date of Patent: Aug. 31, 1993

[54] APPARATUS AND METHOD FOR RECOVERING A TIME-VARYING SIGNAL USING MULTIPLE SAMPLING POINTS

[75] Inventors: Henry L. Kazecki, Arlington Heights; James C. Baker, Hanover Park, both of Ill.

[73] Assignee: Motorola, Inc., Schaumburg, Ill.

[21] Appl. No.: 769,068

[22] Filed: Sep. 30, 1991

Related U.S. Application Data

[63] Continuation-in-part of Ser. No. 612,656, Nov. 14, 1990, Pat. No. 5,195,106, and a continuation-in-part of Ser. No. 633,556, Dec. 21, 1990, Pat. No. 5,182,749.

[51] Int. Cl.$^5$ ................................................ H04J 3/06
[52] U.S. Cl. ................................. 370/106; 370/94.2; 370/100.1; 375/106; 375/114; 375/116
[58] Field of Search ................. 370/100.1, 106, 94.2; 375/106, 95, 116, 114

[56] References Cited

U.S. PATENT DOCUMENTS

4,598,413  7/1986  Szèchènyi ........................... 375/116
4,665,533  5/1987  Tomikawa ........................... 370/106
4,794,624 12/1988  Braun et al. ........................ 375/95 X

Primary Examiner—Douglas W. Olms
Assistant Examiner—Russell W. Blum
Attorney, Agent, or Firm—Kevin D. Kaschke

[57] ABSTRACT

The present invention presents an apparatus and method for recovering symbols in a data packet (101) transmitted to a receiver from a remote signal source (204) in a time-varying channel using multiple sampling points. In a digital cellular radiotelephone TDMA system, the receiver (202) performs a complex correlation on the desired slot sync word (DSSW) and the coded digital verification color code (CDVCC) in the data packet (101), and on the adjacent slot sync word (ASSW) in an adjacent data packet (102) to produce a first, second and third optimum sampling point, respectively. The data packet (101) is divided into four regions (A, B, C and D). The symbols in each region (A, B, C and D) are serially recovered using one or more of the multiple sampling points depending on the quality of the sampling point adjacent to each region (A, B, C and D).

50 Claims, 4 Drawing Sheets

APPARATUS AND METHOD FOR RECOVERING A TIME-VARYING SIGNAL USING MULTIPLE SAMPLING POINTS

RELATED APPLICATIONS

This application is a continuation in part of the instant assignee's co-pending U.S. applications: U.S. Ser. No. 07/612,656, filed on Nov. 14, 1990, now Pat. No. 5,195,106, invented by Henry L. Kazecki, Steven H. Goode, Donald W. Dennis, James C. Baker, Kevin L. Baum and Bruce D. Mueller, entitled "Method for Channel Adaptive Detecting/Equalizing"; and Ser. No. 07/633,556, filed on Dec. 21, 1990, now Pat. No. 5,182,749, invented by Henry L. Kazecki and James C. Baker, entitled "Apparatus and Method for Recovering a Time-Varing Signal in a Serial Data System".

This application is related to the instant assignee's co-pending U.S. application having Ser. No. 07/769,983, filed on the same date herewith, invented by Henry L. Kazecki and James C. Baker, entitled "Apparatus and Method for Adaptively Filtering a Time-Varying Signal Using Multiple Filtering Algorithms".

FIELD OF THE INVENTION

The present invention relates generally to information recovery, and more particularly to an apparatus and method for recovering a time-varying signal using multiple sampling points.

BACKGROUND OF THE INVENTION

The rapid expansion of the number of cellular radio telephones coupled with the desire to provide additional services has prompted the development of a digital standard. The standard suggests an increase in system capacity over the previous analog system through the use of digital modulation and speech coding techniques. The standard for the cellular system is described in detail in Electronic Industries Association, Project Number 2398, January 1991, IS-54 (Revision A), entitled Dual-Mode Mobile Station—Base Station Compatibility Standard. The standard describes in §1.2 a time division multiple access (TDMA) channel 40 milliseconds long divided into six equally sized data packets 6.66 milliseconds long. A data packet is a burst of information characterized by sequentially encoded consecutive pairs of bits, commonly known as symbols.

The standard describes in §2.1.3.3.1 a linear modulation technique known as $\pi/4$ shifted, differentially encoded quadrature phase shift keying ($\pi/4$ DQPSK). The symbols are transmitted into one of four phase angles ($\pm\pi/4$, $\pm3\pi/4$) using differential quadrature component signals producing an eight point phase constellation. The symbols are represented by a normalized magnitude vector and a phase angle. The symbols are transmitted as changes in phase rather than absolute phases.

Signal propagation in the radio frequency band, such as the 800 MHz band for cellular radiotelephones, is generally characterized by two types of channel-induced distortion: time dispersion distortion and multipath distortion. These types of distortion are caused by a rapid rate of change of the received data packet's amplitude over time and are predominantly affected by the frequency of the signal, how rapidly the receiver is moving through its environment and large objects in the vicinity of the receiver. When the amplitude over a portion of the data packet approaches a null, the symbols can be corrupted by noise present in the channel that alters the state of the symbol causing the receiver to detect wrong information.

Time dispersion distortion is usually found in an environment where a large reflecting source, such as a mountain or a tall building, is present. A receiver operating in this environment receives the data packet from a fixed source transmitter and a delayed data packet from the reflecting source. The time delay between the reception of the two data packets results in time dispersion distortion.

Multipath distortion is characterized by many components of the same data packet having different energy levels reaching the receiver at the same time. As a result, the amplitude and phase of a data packet varies over time. This variance is referred to as "Rayleigh fading" of the data packet.

The present challenge is to recover the received symbols in the data packet that were transmitted in the presence of the channel-induced distortion. Typically, the receiver is synchronized to the data packet using a process called correlation. Synchronization is described in Chapter 8 of Digital Communications, Fundamentals and Applications by Bernard Sklar (1988). For systems with rapid acquisition requirements, such as the digital cellular system, the data packet has a synchronization codeword. A corresponding codeword in the receiver is correlated to the data packet until it is matched with the synchronization codeword. A data packet having multiple sampling points per symbol is synchronized to the receiver using the correlation process to determine the sampling point for all the symbols in the data packet. The sampling point of a symbol corresponds to the value of the detected sample when it is closest to one of the eight points on the phase constellation. Symbols recovered at the sampling point have the best chance of being detected correctly in the presence of channel-induced distortion to minimize the receiver's bit error rate (BER) performance.

Unfortunately, variations in amplitude over the duration of the data packet due to the channel-induced distortion can cause the sampling point for symbol recovery to vary. This situation is particularly apparent in data packets having a long time duration such as in the digital cellular system. Correlation of the receiver to the codeword in the data packet reflects channel conditions only for the instant in time at which correlation occurred. The sampling point determined from correlation codeword in one portion of a data packet may not be optimal for symbols in another portion of the data packet. Additionally, some or all of the symbols in the synchronization codeword may be distorted resulting in such poor correlation that the sampling point for symbol recovery would be based upon an estimated sampling point. For an operator of a receiver using this type of radio system in a time-varying channel, the estimated sampling point may cause distorted audio reception or loss of transmitted data or control information.

For many situations, of which a cellular radiotelephone is merely an example, the prior art has not produced an apparatus or method of information recovery to meet the difficult requirement of providing a substantially valid sampling point over the duration of a time-varying signal.

SUMMARY OF THE INVENTION

A signal including first and second codewords is received and stored. First and second sampling points are determined corresponding to the first and second codewords, respectively. A portion of the signal is recovered responsive to at least one of the determined first and second sampling points.

BRIEF DESCRIPTION OF THE DRAWINGS

FIG's. 4A and 4B describe the decision process carried out in the digital signal processor of FIG. 2 for recovering symbols in the data packet of FIG. 1 using multiple sampling points.

DETAILED DESCRIPTION OF A PREFERRED EMBODIMENT

Figure 1:
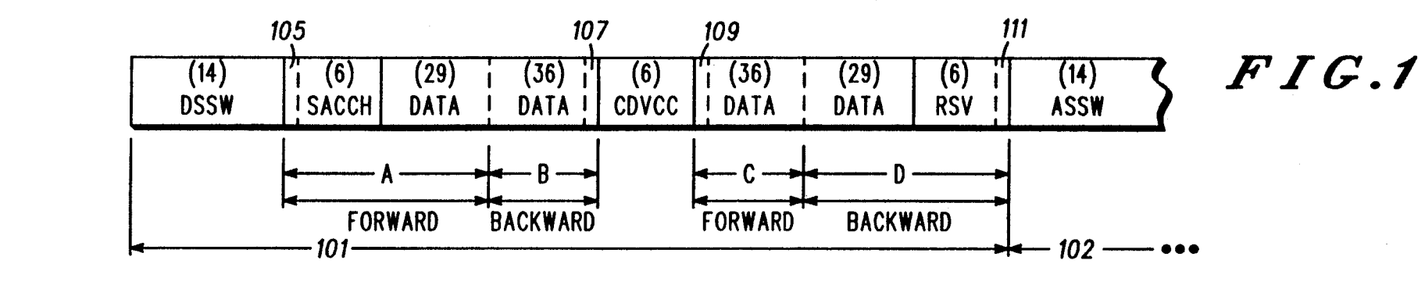
FIG. 1 illustrates the format for a data packet in a TDMA system having regions that are processed in accordance with the present invention.

FIG. 1 illustrates the format for a data packet 101 in a TDMA system. A receiver 202 (shown in FIG. 2) selectively receives digital information transmitted from a remote signal source 204. The digital information includes a plurality of symbols. A predetermined number of symbols forms a data packet 101 having information intended for the receiver 202.

In the TDMA system, the data packet 101 includes one codeword providing synchronization, a desired slot sync word (DSSW), and a coded digital voice color code (CDVCC). A second data packet 102 adjacent to the data packet 101 also has a codeword for synchronization designated as the adjacent slot sync word (ASSW) because of its location to the data packet 101. A primary feature of the preferred embodiment of the present invention is that a sampling point is determined for the DSSW, the CDVCC and the ASSW.

The data packet 101 is divided into four regions (A, B, C and D) for symbol recovery, each region (A, B, C and D) is adjacent to one of the three codewords. The symbols in each region (A, B, C and D) are recovered using the sampling point determined from the adjacent codeword. Thus, recovery of the symbols in the data packet 101 may use multiple sampling points rather than only a conventional single sampling point.

Symbol recovery using multiple sampling points is advantageous for receiving long data packets transmitted in a time-varying channel to minimize the received bit error rate. Some types of channel distortion, for example, time dispersion distortion, may cause the timing of the transmitted symbols relative to the timing of the receiver to vary after an initial correlation. Correlating the receiver to codewords associated with corresponding regions in the data packet determines the timing, i.e. the sampling point, of the receiver for recovering the symbols in those regions.

Figure 2:
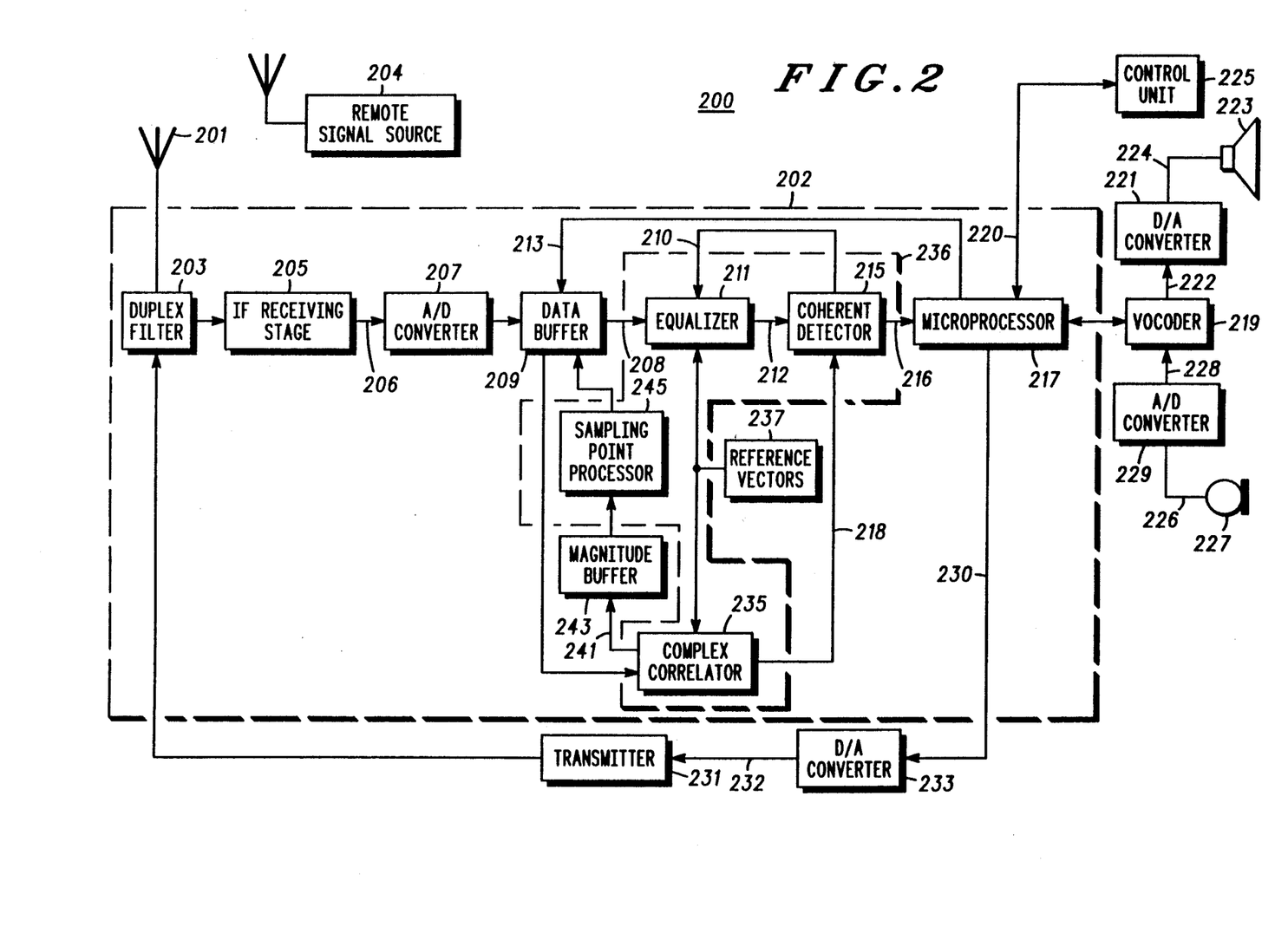
FIG. 2 is a block diagram for a radiotelephone transceiver incorporating a receiver for receiving the data packet of FIG. 1.

Other types of channel distortion, for example, multipath distortion, may cause poor correlation to one or more sampling points. However, it is unlikely that poor correlation would result for all the codewords given the duration of the data packet 101. Correlation to multiple codewords to determine multiple sampling points enables the receiver to recover the symbols with one or more sampling points. A receiver 202 employing the present invention may result in improved audio quality, receiver control operation or data reception for the received data packet transmitted in a time-varying channel.

The data packet 101 includes in sequential order: the DSSW having fourteen symbols, a slow associated control channel (SACCH) having six symbols, sixty-five symbols of data, the CDVCC having six symbols, another sixty-five symbols of data, and six symbols reserved (RSV) for future use. Sequentially following the RSV symbols is the ASSW having fourteen symbols residing in the adjacent data packet 102. The DSSW and the ASSW are typically used for synchronization, equalizer retraining and time slot verification of the data packet 101 and the adjacent data packet 102, respectively, as described in the standard per §1.2.4. The DSSW and the ASSW have good autocorrelation properties to facilitate synchronization and training. The CDVCC described in the standard §1.2.5 provides the receiver 202 with channel control information.

Region A includes the six SACCH symbols and twenty-nine data symbols and is adjacent to the DSSW. Region B includes thirty-six data symbols adjacent to the left side of the CDVCC. Region C includes the thirty-six data symbols adjacent to the right side of the CDVCC. Region D includes the six RSV symbols and the twenty-nine data symbols and is adjacent to the ASSW.

The symbols is region A are recovered in a forward direction in time using a first sampling point determined from correlating the receiver 202 to the DSSW. The symbols in region B are recovered in a reverse direction in time using a second sampling point determined from correlating the receiver 202 to the CDVCC. The symbols in region C are recovered in a forward direction in time using the second sampling point determined from correlating the receiver 202 to the CDVCC. The symbols in region D are recovered in a reverse direction in time using a third sampling point determined from correlating the receiver to the ASSW.

The present invention is not intended to be limited to the specified number of regions or sampling points as described with reference to FIG. 1. Rather, any number of sampling points or regions greater than one may be used to recover the received information. Also, the present invention is not restricted to only data formatted in accordance with the IS-54 digital standard. Rather, the present invention may be applied to any like signal format.

A block diagram of a cellular radiotelephone 200 employing the present invention is shown in FIG. 2. Radio frequency signals within a radio frequency band are coupled to a duplex filter 203 via an antenna 201. The duplex filter 203 separates the receive and transmit band of frequencies such that a signal may be received at the same time another signal is transmitted.

An IF receiving stage 205 comprises a filter that is more selective to generate an IF signal at line 206 having a particular frequency within the received band of radio frequency signals. The IF signal at line 206 is converted from an analog signal to a digital signal in the A/D Converter 207 to generate the data packet 101. The data packet 101 is stored in a data buffer memory location at block 209.

A frame sync signal 213 from a microprocessor 217 synchronizes the receiver 202 to the symbols to approximately locate the synchronous codewords in time.

A sampling point processor 245 determines the sampling point for recovery of symbols in the data packet 101. The sampled data packet 101 appearing at line 208 is processed by an equalizer 211 along with a recovered coherent carrier signal at line 210 and a reference vector signal from block 237 to remove time dispersion distortion in the data packet 101. An equalized signal is generated by the equalizer 211 at line 212. A typical channel equalizer structure 211 is a decision feedback equalizer (DFE). The DFE tracks the phase of the data packet and cancels the distortion caused by a delayed version of the data packet. DFE's are described in John Proakis, Digital Communications, Chapter 6 (1989).

The data packet 101 in the data buffer 209 is also coupled to a complex correlator 235. The complex correlator 235 detects the synchronous codeword using a complex correlation of the CDVCC, for example, and a corresponding reference vector stored at block 237. The reference vector has the same value as the predetermined value of the CDVCC. The complex correlator generates a plurality of magnitude output signals at line 241 which are stored in a memory location in a magnitude buffer 243. The sampling point processor 245 compares the plurality of magnitude output signals against each other and selects the peak magnitude output signal. The peak magnitude output signal corresponds to the sampling point at the time of the correlation to the CDVCC in the data packet 101. The sampling point is coupled to the data packet 101 in the data buffer 209 for symbol recovery. Another sampling point is also determined for the DSSW and the ASSW for symbol recovery in the regions A, B, C and D of the data packet 101. Thus, multiple sampling points may be used for symbol recovery of the data packet in a time-varying channel.

Once the distortion is cancelled, a point on the eight point constellation representing a recovered symbol at line 216 is generated by a coherent detector 215 by combing the equalized signal at line 212 and a phase reference signal at line 218 from the complex correlator 235. Coherent detectors are typically used in digital communications for symbol recovery. Coherent detection is described in Bernard Sklar, Digital Communications, Fundamentals and Applications, Chapter 3 (1988).

A microcomputer 217 separates the recovered voice and control symbols. Voice symbols are coupled to a vocoder 219 which decode the voice symbols to produce a digital representation of the voice signal at line 222. The digital voice signal at line 222 is converted to an analog voice signal at line 224 in a D/A Converter 221. The analog voice signal at line 224 is coupled to a speaker 223 providing audible voice.

Voice and control information may be transmitted by the digital cellular radiotelephone 200. The IS-54 standard calls out the content of a transmitted plurality of sequential symbols to be different than the content of the received plurality of sequential symbols. An audible voice message coupled to a microphone 227 produces an analog voice signal at line 226 and is converted to a digital voice signal at line 228 in a analog to digital converter 229. The digital voice signal at line 228 is encoded into symbol information by the vocoder 219. The encoded symbol information is formatted into the data packet 101 with any control information from a control unit 225. The control unit 225 may have a keypad and a display (not shown). The control unit information is coupled between the microcomputer 217 and a control unit 225. The formatted data packet 101 at line 230 is converted to an analog signal at line 232 by a digital to analog converter 233. The analog signal 232 is transmitted by the transmitter 231 via the duplex filter 203 for subsequent radiation by the antenna 201.

The equalizer 211, the coherent detector 215, the complex correlator 235 and the sampling point processor 245 are employed in a digital signal processor, such as DSP56000/56001, produced by Motorola Inc. The use of the DSP56000/56001 is described in DSP56000/56001 Digital Signal Processor User Manual, Revision 1, available from Motorola Inc. The data buffer and the magnitude buffer are memory portions of conventional read access memory (RAM). The reference vectors at block 237 is stored in conventional read only memory (ROM).

The principles governing the complex correlator are well known in the art. The complex correlator 235 may be in the form of a complex finite impulse response filter (FIR), i.e., it contains four real FIR filters. Correlation is done by treating the in-phase and quadrature-phase components of the symbol as a complex number with the magnitude of the I channel representing the real component and the magnitude of the Q channel representing as the imaginary component.

The portion of the data packet 101 having the synchronous codeword, such as the DSSW, CDVCC or the ASSW, is represented by the following equation:

$$m(kT) = I(kT) + jQ(kT) = a + jb$$

wherein "T" is the symbol time and "k" is a time index as well as a variable of summation. The complex correlation, C, of the input waveform, m(kT), with a reference waveform from block 237, n(kT)=c+jd, is represented by the following equation:

$$C = \Sigma[m(kT)n^*(kT)]$$

wherein n* denotes the complex conjugate of n(kT), c−jd.

The complex correlation, C, having the input synchronous codeword represented by a+jb and a complex conjugate represented by c−jd results in a real output of ac+bd and an imaginary output of j(bc−ad). The magnitude output signal, M, generated at line 241 of the complex correlation 235 is calculated by summing the square of the real output and the square of the imaginary output as follows:

$$M = \sqrt{(ac + bd)^2 + (bc - ad)^2}$$

Figure 3A:
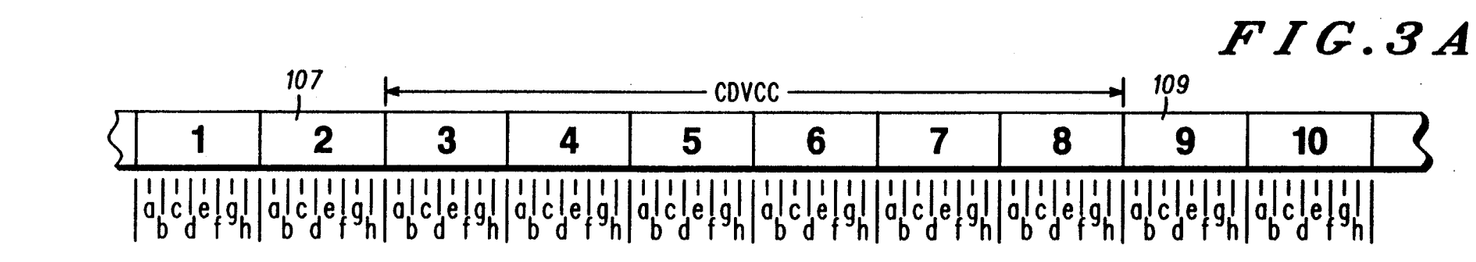
FIG. 3A shows a portion of the data packet of FIG. 1 having eight samples (a–h) per symbol (1–10) and including the CDVCC.

An example of the complex correlation process is described with FIG.'s 3A and 3B. FIG. 3A shows a portion of the data packet of FIG. 1 having the CDVCC wherein each symbol is sampled eight times (a–h). Using a frame synchronization procedure, the receiver 202 can determine the approximate location of the synchronous codeword, CDVCC for example. The approximate location of the codeword in the data packet is known in the art as a window. The complex correlation is performed over the smallest window possible to minimize correlation processing time. In accordance with the present invention, a four symbol window is used, i.e. four symbols in addition to the number of symbols in the CDVCC. Under other system circumstances, the number of symbols in the window may vary. The four symbol window in FIG. 3A comprises the CDVCC having six symbols 3-8, the data symbols 1 and 2 to the left of symbol 3 and the data symbol 9 and 10 to the right of symbol 8. The CDVCC may appear anywhere within the window. For example, only one symbol may appear at the left of the CDVCC and resulting in three symbols appearing at the right of the CDVCC.

Figure 3B:
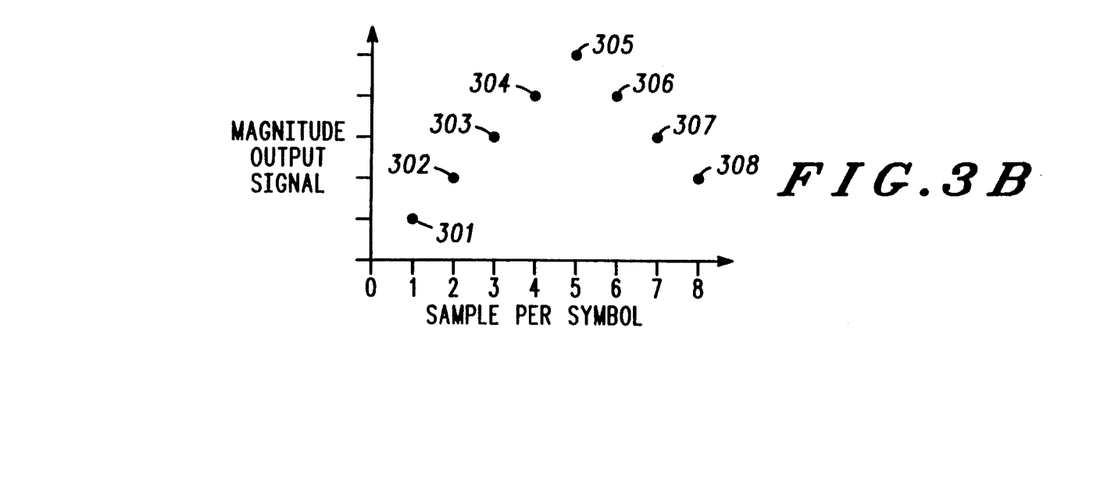
FIG. 3B is a plot of eight magnitude output signals from the complex correlator of FIG. 2.

FIG. 3B is a plot of eight magnitude output signals 301-308 at line 241 generated by the complex correlator 235 of FIG. 2. The complex correlation is performed on each sample of the four symbol window shown in FIG. 3A with the corresponding reference vector from block 237. Each complex correlation produces a magnitude output signal from the complex correlator 235. Correlating the reference vector to the CDVCC over a four symbol window produces thirty two magnitude output signals (eight samples/symbol times a four symbol window). Of the thirty two correlations, one magnitude calculation provides the best information for determining the sampling point for the CDVCC.

For the sake of brevity, only eight magnitude output signals are plotted in FIG. 3B. The magnitude output signals 301-308 correspond to the complex correlation of each symbol of the reference vector with the same sample of each symbol 3-8, respectively, of the CDVCC. For instance, the magnitude output signal 301 is produced by correlating the six symbols of the reference vector to sample "a" of the six symbols 3-8 of the CDVCC, respectively. Similarly, magnitude output signal 305 is produced by correlating the six symbols of the reference vector to sample "e" of the six symbols 3-8 of the CDVCC, respectively.

The magnitude output signals vary in intensity depending on how close the reference vector is correlated to the CDVCC. The best correlation is indicated by a peak magnitude output signal denoted point 305 in FIG. 3B. The peak magnitude output signal corresponds to the optimum sampling point for the CDVCC in the data packet at that particular instant in time. Although the complex correlation described with FIG.'s 3A and 3B involve a particular matching process, other algorithms may be utilized to determine the optimum sampling point.

In the preferred embodiment of the present invention, a peak magnitude output signal corresponding to an optimum sampling point is determined for the DSSW, the CDVCC and the ASSW. Thus, multiple sampling points are available for recovering all the symbols within corresponding discrete regions at different points in time over the duration of the data packet 101. Depending on the type of distortion in the channel and the signal intensity over the duration of the data packet 101, decisions may be made on which region of the data packet 101 to recover using one of the selected sampling points.

This application is related to the instant assignee's co-pending U.S. Ser. No. 07/769,983, filed on the same date herewith, invented by Henry L. Kazecki and James C. Baker, entitled "Apparatus and Method for Aadaptively Filtering a Time-Varying Signal Using Multiple Filtering Algorithms". Multiple filtering algorithms may be used in cooperation with symbols recovery using multiple sampling points. For example, the symbols in region A are filtered using two filtering algorithms to reduce the complexity of the equalizer without substantially degrading the received bit error rate performance.

Figure 4A:
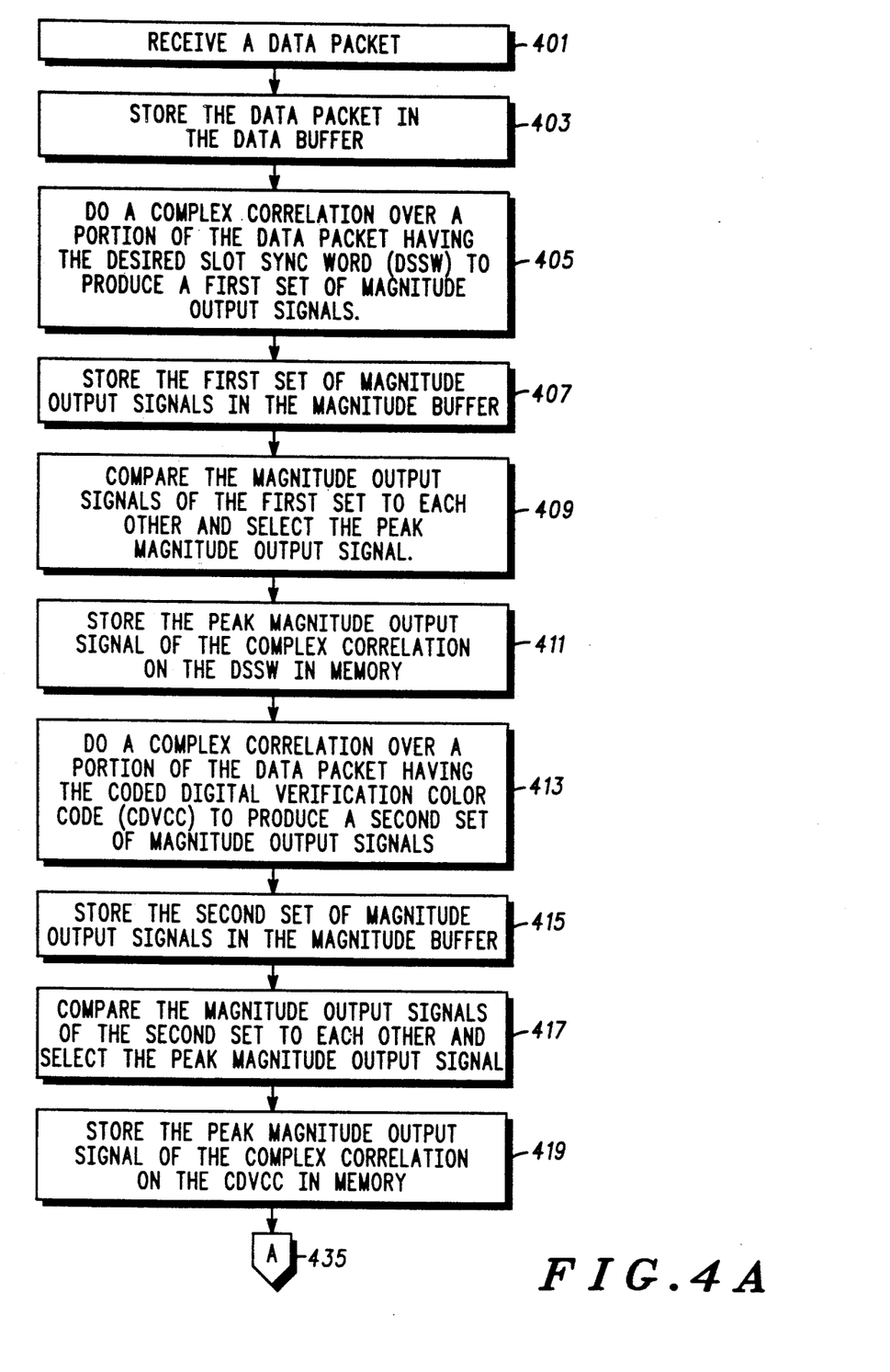
Figure 4B:
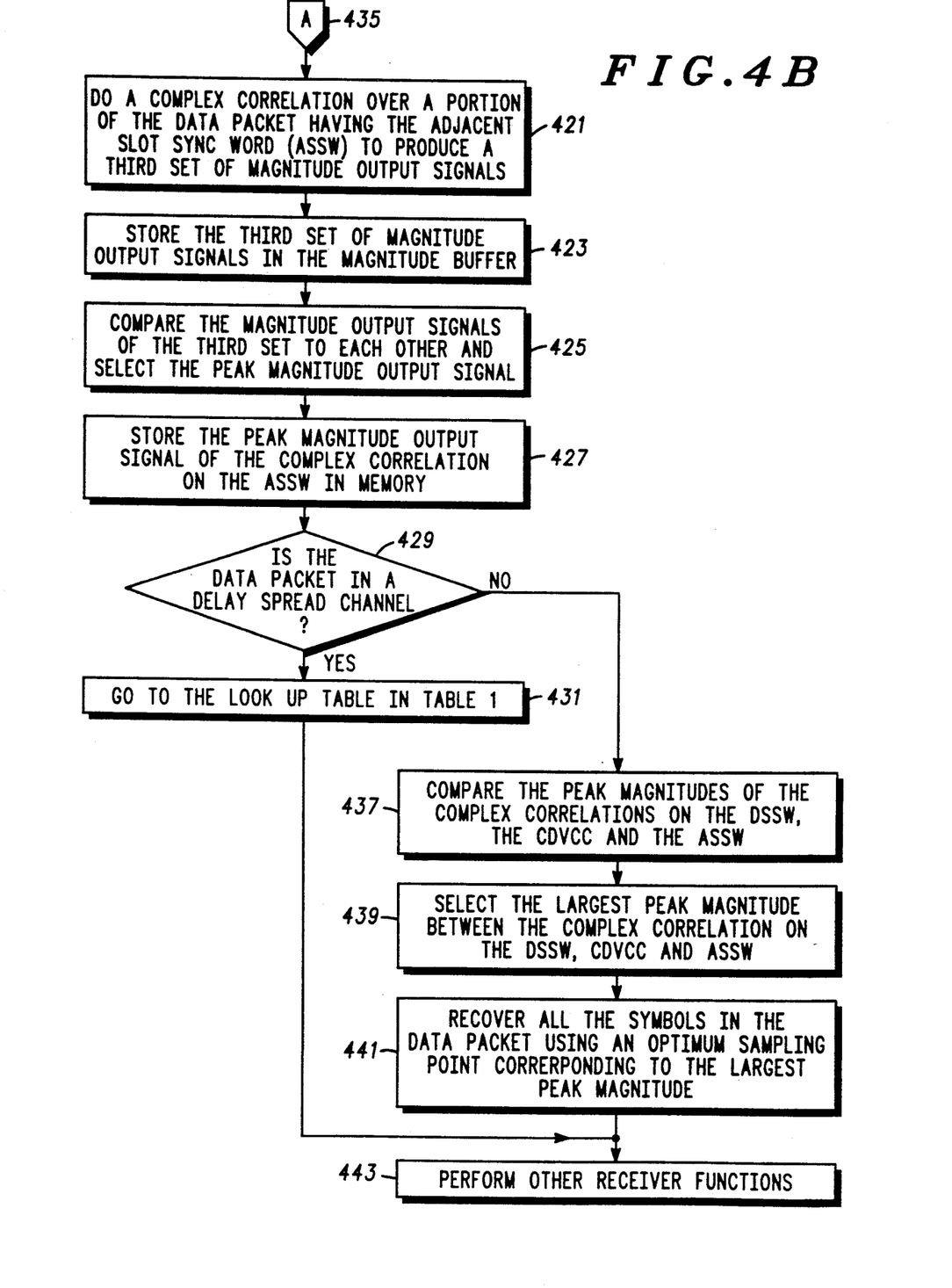

FIG's. 4A and 4B describe the decision process carried out in the DSP/56001 for recovering symbols using multiple sampling points. In general, an optimum sampling point is determined for each synchronous codeword (DSSW, CDVCC and ASSW) and then a decision is made regarding which sampling point to use for recovering the symbols in the various regions based upon the type of distortion present on the channel.

The flow in FIG. 4A begins at block 401 wherein the data packet 101 is received by the antenna 201 shown in FIG. 2. The data packet 101 is stored in the data buffer 209 at block 403 for future processing. The complex correlator 235 correlates the window of the data packet 101 having the desired slot sync word (DSSW) at block 405. Each sample of the symbols in the window of the data packet are correlated to the symbols of the reference vector. The reference vector has a predetermined value equal to the predetermined value of the DSSW. The complex correlations result in a first set of magnitude output signals.

The first set of magnitude output signals at block 405 are stored in the magnitude output buffer 243 at block 407. The sampling point processor 245 compares the magnitude output signals of the first set to each other and selects the peak magnitude output signal at block 409. The peak magnitude output signal (point 305 of FIG. 3B) corresponds to the optimum sampling point "e" for the DSSW. The peak magnitude output signal corresponding to the optimal sampling point is stored in the sampling point processor's memory at block 411 for later use in recovering symbols in the data packet 101.

In a similar manner, the optimal sampling point for the CDVCC is determined and stored in memory at blocks 413, 415, 417 and 419. Block 429 in FIG. 4A is coupled to block 421 in FIG. 4B via a transition block 435. Likewise, the optimal sampling point for the ASSW is determined and stored in memory at blocks 421, 423, 425 and 427. Thus, the optimal sampling point for the DSSW, the CDVCC and the ASSW have been determined and stored in memory for later use in recovering symbols in the data packet 101. Determining multiple sampling points for symbol recovery of a data packet in a time-varying channel is a unique feature of the present invention.

After the multiple sampling points have been determined, a determination is made as to the type of distortion present in the data packet 101 and thereafter the quality of the multiple sampling points. At block 429, a determination is made if the data packet 101 is in a delay spread channel. U.S. Pat. having Ser. No. 07/612656, filed on Nov. 14, 1990, invented by Henry L. Kazecki, Steven H. Goode, Donald W. Dennis, James C. Baker, Kevin L. Baum and Bruce D. Mueller, entitled "Method for Channel Adaptive Detecting/Equalizing" discloses adaptive switching between an equalizer and a coherent detector or detectors to recover data from a received signal. The switching is accomplished dynamically, depending on whether the receiver 202 is in a delay spread distortion environment, as the signal is received. If the data packet 101 is in a delay spread channel, the optimal sampling point for different symbols over the duration of the data packet 101 will vary so the process continues to block 431. At block 431, the process refers to TABLE 1, a look up table, for further decisions on data recovery using the multiple sampling points.

TABLE 1

| DSSW | CDVCC | ASSW | DSSW | CDVCC | ASSW |
|---|---|---|---|---|---|
| 0 | 0 | 0 | go to block 437 of FIG. 4B | | |
| 0 | 0 | 1 | | | A,B,C,D |
| 0 | 1 | 0 | | A,B,C,D | |
| 0 | 1 | 1 | | A,B,C | D |
| 1 | 0 | 0 | A,B,C,D | | |
| 1 | 0 | 1 | A,B | | C,D |
| 1 | 1 | 0 | A | B,C,D | |
| 1 | 1 | 1 | A | B,C | D |

TABLE 1 generally determines which region (A, B, C or D) of symbols in the data packet 101 to recover with the optimal sampling point corresponding to the DSSW, the CDVCC and the ASSW. The determination is made based on the quality of the optimal sampling point for each synchronous codeword. If the peak magnitude corresponding to the optimal sampling point for the synchronous codeword is above a predetermined threshold, it is given a binary number one. If the peak magnitude corresponding to the optimal sampling point for the synchronous codeword is below a predetermined threshold, it is given a binary number zero.

For example, if all three peak magnitude signals corresponding to the synchronous codewords are below the predetermined threshold, the flow continues to block 437 of FIG. 4B. If only the peak magnitude corresponding to the ASSW is above the predetermined threshold, all the regions (A, B, C and D) are recovered using the optimal sampling point determined from the ASSW. If the peak magnitude signals corresponding to the DSSW and the CDVCC synchronous codewords are above the predetermined threshold and the peak magnitude signal corresponding to the ASSW synchronous codeword is below the predetermined threshold, the symbols in region A are recovered using the optimal sampling point determined from the DSSW. The symbols in region B, C and D are recovered using the optimal sampling point determined from the CDVCC. All eight cases of optimal sampling point determination for each synchronous codeword are accounted for in order to recover the symbols in each region.

After the optimal sampling point and region for recovery have been determined, the symbols are serially recovered beginning with the first symbol adjacent to the synchronous codeword having a valid optimal sampling point. The symbol adjacent to the DSSW is symbol 105 in the SACCH portion of the data packet 101 in FIG. 1. The symbols adjacent to the CDVCC are symbols 107 and 109 in FIG. 1. The symbol adjacent to the ASSW is symbol 111 in FIG. 1.

The following example describes symbol recovery for all the symbols in the data packet 101 wherein all three optimal sampling points are above the threshold. Recovery begins with symbol 105 in region A in a forward direction in time using the sampling point determined at the DSSW. Symbol recovery continues with the symbol 107 to recover the symbols in region B of the data portion in a reverse direction in time using the sampling point determined at the CDVCC. Symbol recovery continues with symbol 109 to recover the symbols in region C of the data portion in a forward direction in time using the sampling point determined at the CDVCC. The recovery process continues with symbol 111 in the RSV portion then continues into the data portion to recover the symbols in region D in a reverse direction in time using the sampling point determined at the ASSW. Thus, all the symbols in the data packet 101 are recovered using multiple sampling points.

Recovering symbols in a data packet in a forward and reverse direction in time has been disclose in U.S. Pat. having Ser. No. 07/633556, filed on Dec. 21, 1990, invented by Henry L. Kazecki and James C. Baker, entitled "Apparatus and Method for Recovering a Time-Varying Signal in a Serial Data System". After recovering the symbols in the data packet the flow continues to block 443 wherein the receiver 202 performs other standard functions such as mobile assisted handoff (MAHO), voice or data determination, and updating the frequency of the automatic frequency control loop.

If a determination is made at block 429 in FIG. 4B that the data packet is not in a delay spread channel, then the flow continues to block 437. At block 437, the peak magnitudes of the complex correlations on the DSSW, the CDVCC and the ASSW are compared. At block 439 the largest peak magnitude resulting from the comparison is selected. At block 441, all the symbols in the data packet 101 are recovered using the optimum sampling point corresponding to the largest peak magnitude selected. Recovering symbols using this process is useful in channels having flat fading conditions wherein the signal level of each symbol is relatively constant over the duration of the data packet 101. After recovering the symbols in the data packet 101 the flow continues to block 443 wherein the receiver 202 performs other standard functions such as mobile assisted handoff (MAHO), voice or data determination, and updating the frequency of the automatic frequency control loop.

The preferred embodiment of the present invention may be used in the remote signal source 204 acting as a base station for receiving radio signals from the radiotelephone subscriber unit 200. The base station receives from one subscriber unit a data packet having the DSSW and the CDVCC. The ASSW is received from another subscriber unit.

What is claimed is:

1. A radio frequency receiver for receiving a plurality of sequential symbols transmitted from a remote signal source, the plurality of sequential symbols having at least first and second synchronous codewords, each symbol having a plurality of sampling points, a predetermined number of sequential symbols forming a data packet including at least one of the first and second synchronous codewords, the radio frequency receiver comprising:

means for storing the plurality of sequential symbols;
means for locating the first and second synchronous codewords among the stored plurality of sequential symbols;
means for determining first and second sampling point responsive to the located first and second synchronous codewords, respectively; and
means for serially recovering at least a portion of the data packet responsive to at least one of the determined first and second sampling points.

2. A radio frequency receiver in accordance with claim 1 further comprising means for dividing the data packet into a first and a second region, the symbols in the first region of the data packet are recovered responsive to the determined first sampling point and the symbols in the second region of the data packet are recovered responsive to the determined second sampling point.

3. A The radio frequency receiver in accordance with claim 1 wherein the first and second synchronous codewords further comprise a desired slot sync word for the data packet and an adjacent slot sync word for another data packet adjacent to the data packet, respectively.

4. A radio frequency receiver in accordance with claim 1 wherein the plurality of sequential symbols further comprises a third synchronous codeword.

5. A The radio frequency receiver in accordance with claim 4 wherein the third synchronous codeword further comprises a coded digital voice color code in the data packet.

6. A radio frequency receiver in accordance with claim 4 further comprising:
   means for locating the third synchronous codeword;
   means for determining a third sampling point responsive to the located third synchronous codeword; and
   means for serially recovering symbols in a third region of the data packet responsive to at least the determined third sampling point.

7. A radio frequency receiver in accordance with claim 1 wherein said means for determining further comprises:
   means for correlating the located first and second synchronous codewords with first and second reference vectors, respectively, to produce first and second plurality of magnitude signals, respectively;
   means for selecting a first peak magnitude, corresponding to the determined first sampling point, from the first plurality of magnitude signals; and
   means for selecting a second peak magnitude, corresponding to the determined second sampling point, from the second plurality of magnitude signals.

8. A radio frequency receiver in accordance with claim 1 further comprising means for determining the quality of the determined first and second sampling points.

9. A radio frequency receiver in accordance with claim 8 wherein the means for determining further comprises means for comparing first and second peak magnitudes, corresponding to the determined first and second sampling points, respectively, to a predetermined magnitude threshold.

10. A radio frequency receiver in accordance with claim 8 wherein the means for determining further comprises means for selecting the largest of first and second peak magnitudes corresponding to the determined first and second sampling points, respectively.

11. A radio frequency receiver in accordance with claim 1 wherein the receiver is part of a radiotelephone subscriber unit.

12. A radio frequency receiver in accordance with claim 1 wherein the receiver is part of a radiotelephone base station.

13. A method for receiving a plurality of sequential symbols transmitted from a remote signal source, the plurality of sequential symbols having at least first and second synchronous codewords, each symbol having a plurality of sampling points, a predetermined number of sequential symbols forming a data packet including at least one of the first and second synchronous codewords, the method comprising the steps of:
   storing the plurality of sequential symbols;
   locating the first and second synchronous codewords among the stored plurality of sequential symbols;
   determining first and second sampling points responsive to the located first and second synchronous codewords, respectively; and
   serially recovering at least a portion of the data packet responsive to at least one of the determined first and second sampling points.

14. A method for receiving in accordance with claim 13 further comprising the step of dividing the data packet into a first and a second region, the symbols in said first region of the data packet are recovered responsive to the determined first sampling point and the symbols in the second region of the data packet are recovered responsive to the determined second sampling point.

15. A method for receiving in accordance with claim 13 wherein the step of determining further comprises the steps of:
   correlating the located first and second synchronous codewords with first and second reference vectors, respectively, to produce first and second plurality of magnitude signals, respectively;
   selecting a first peak magnitude, corresponding to the determined first sampling point, from the first plurality of magnitude signals; and
   selecting a second peak magnitude, corresponding to the determined second sampling point, from the second plurality of magnitude signals.

16. A method for receiving in accordance with claim 13 further comprising the step of determining the quality of the determined first and second sampling points.

17. A method for receiving in accordance with claim 16 wherein the step of determining further comprises the step of comparing first and second peak magnitudes, corresponding to the determined first and second sampling points, respectively, to a predetermined magnitude threshold.

18. A method for receiving in accordance with claim 16 wherein the step of determining further comprises the step of selecting the largest of first and second peak magnitudes corresponding to the determined first and second sampling points, respectively.

19. A wireless communication device comprising:
   antenna means;
   a transmitter for transmitting a first plurality of sequential symbols from the antenna means; and
   a receiver for receiving a second plurality of sequential symbols from the antenna means, the second plurality of sequential symbols having at least first and second synchronous codewords, each symbol having a plurality of sampling points, a predetermined number of sequential symbols forming a data packet including at least one of the first and second synchronous codewords, the receiver comprising:
   means for storing the second plurality of sequential symbols;
   means for locating the first and second synchronous codewords among the stored plurality of sequential symbols;
   means for determining first and second sampling points responsive to the located first and second synchronous codewords, respectively; and
   means for serially recovering at least a portion of the data packet responsive to at least one of the determined first and second sampling points.

20. A wireless communication device in accordance with claim 19 wherein the receiver further comprises means for dividing the data packet into a first and a second region, the symbols in the first region of the data packet are recovered responsive to the determined first sampling point and the symbols in the second region of the data packet are recovered responsive to the determined second sampling point.

21. A wireless communication device in accordance with claim 19 wherein the first and second synchronous codewords further comprise a desired slot sync word for the data packet and an adjacent slot sync word for another data packet adjacent to the data packet, respectively.

22. A wireless communication device in accordance with claim 19 wherein the plurality of symbols further comprises a third synchronous codeword.

23. A wireless communication device in accordance with claim 22 wherein the third synchronous codeword further comprises a coded digital voice color code in the data packet.

24. A wireless communication device in accordance with claim 22 wherein the receiver further comprises:
   means for locating the third synchronous codeword;
   means for determining a third sampling point responsive to the located third synchronous codeword; and
   means for serially recovering symbols in a third region of the data packet responsive to at least the determined third sampling point.

25. A wireless communication device in accordance with claim 19 wherein the means for determining further comprises:
   means for correlating the located first and second synchronous codewords with first and second reference vectors, respectively, to produce first and second plurality of magnitude signals, respectively;
   means for selecting a first peak magnitude, corresponding to the determined first sampling point, from the first plurality of magnitude signals; and
   means for selecting a second peak magnitude, corresponding to the determined second sampling point, from the second plurality of magnitude signals.

26. A wireless communication device in accordance with claim 19 wherein the receiver further comprises means for determining the quality of the determined first and second sampling points.

27. A wireless communication device in accordance with claim 26 wherein the means for determining further comprises means for comparing first and second peak magnitudes, corresponding to the determined first and second sampling points, respectively, to a predetermined magnitude threshold.

28. A wireless communication device in accordance with claim 26 wherein the means for determining further comprises means for selecting the largest of first and second peak magnitudes corresponding to the determined first and second sampling points, respectively.

29. A wireless communication device in accordance with claim 19 wherein the antenna means, the transmitter and the receiver together comprise a radiotelephone subscriber unit.

30. A wireless communication device in accordance with claim 19 wherein the antenna means, the transmitter and the receiver together comprise a radiotelephone base station.

31. A method of communication in a wireless communication device comprising the steps of:
   transmitting a first plurality of symbols from an antenna means; and
   receiving a second plurality of sequential symbols from the antenna means, the second plurality of sequential symbols having at least first and second synchronous codewords, each symbol having a plurality of sampling points, a predetermined number of sequential symbols forming a data packet including at least one of the first and second synchronous codewords, the method for receiving comprising the steps of:
   storing the second plurality of sequential symbols;
   locating the first and second synchronous codewords among the stored plurality of sequential symbols;
   determining first and second sampling points responsive to the located first and second synchronous codewords, respectively; and
   serially recovering at least a portion of the data packet responsive to at least one of the determined first and second sampling points.

32. A method in accordance with claim 31 wherein the step of receiving further comprises the step of dividing the data packet into a first and a second region, the symbols in the first region of the data packet are recovered responsive to the determined first sampling point and the symbols in the second region of the data packet are recovered responsive to the determined second sampling point.

33. A method in accordance with claim 31 wherein the step of determining further comprises the steps of:
   correlating the located first and second synchronous codewords with first and second reference vectors, respectively, to produce first and second plurality of magnitude signals, respectively;
   selecting a first peak magnitude, corresponding to the determined first sampling point, from the first plurality of magnitude signals; and
   selecting a second peak magnitude, corresponding to the determined second sampling point, from the second plurality of magnitude signals.

34. A method in accordance with claim 31 wherein the step of receiving further comprises the step of determining the quality of the determined first and second sampling points.

35. A method in accordance with claim 34 wherein the step of determining further comprises the step of comparing first and second peak magnitudes, corresponding to the determined first and second sampling points, respectively, to a predetermined magnitude threshold.

36. A method in accordance with claim 34 wherein the step of determining further comprises the step of selecting the largest of first and second peak magnitudes corresponding to the determined first and second sampling points, respectively.

37. An apparatus for receiving a signal including at least first and second codewords, comprising:
   means for storing the signal;
   means for determining first and second sampling points corresponding to the first and second codewords, respectively; and
   means for recovering at least a portion of the signal responsive to at least one of the determined first and second sampling points.

38. An apparatus in accordance with claim 37 wherein first and second regions of the signal portion are recovered responsive to the determined first and second sampling points, respectively.

39. An apparatus in accordance with claim 37 further comprising means for determining the quality of the determined first and second sampling points.

40. A method for receiving a signal including at least first and second codewords, comprising the steps of:
   storing the signal;
   determining first and second sampling points corresponding to the first and second codewords, respectively; and
   recovering at least a portion of the signal responsive to at least one of the determined first and second sampling points.

41. A method in accordance with claim 40 wherein first and second regions of the signal portion are recovered responsive to the determined first and second sampling points, respectively.

42. A method in accordance with claim 40 further comprising the step of assessing the quality of the determined first and second sampling points.

43. An apparatus for receiving a digital signal in a time division multiple access system, the digital signal including a plurality of data packets, each data packet having a codeword, the apparatus comprising:
   means for storing the digital signal;
   means for determining, prior to recovery, first and second sampling points corresponding to the codewords of first and second data packets, respectively; and
   means for recovering at least a portion of the first data packet responsive to at least one of the determined first and second sampling points.

44. An apparatus in accordance with claim 43 wherein the first data packet includes first and second regions recovered responsive to the determined first and second sampling points, respectively.

45. An apparatus in accordance with claim 43 wherein each data packet further comprises a coded digital voice color code (CDVCC), the apparatus further comprises:
   means for determining a third sampling point corresponding to the CDVCC of the first data packet; and
   means for recovering a third region of the first data packet responsive to the determined third sampling point.

46. A method for receiving a digital signal in a time division multiple access system, the digital signal including a plurality of data packets, each data packet having a codeword, the method comprising the steps of:
   storing the digital signal;
   determining, prior to recovery, first and second sampling points corresponding to the codewords of first and second adjacent data packets, respectively; and
   recovering at least a portion of the first data packet responsive to at least one of the determined first and second sampling points.

47. A method in accordance with claim 46 wherein first and second regions of the first data packet are recovered responsive to the determined first and second sampling points, respectively.

48. A method in accordance with claim 46 wherein each data packet further comprises a coded digital voice color code (CDVCC), the method further comprises the steps of:
   determining a third sampling point corresponding to the CDVCC of the first data packet; and
   recovering a third region of the first data packet responsive to the determined third sampling point.

49. A radiotelephone comprising:
   transmitting means for transmitting a first signal; and
   receiving means for receiving a second signal including at least first and second codewords, further comprising:
      means for storing the second signal;
      means for determining first and second sampling points corresponding to the first and second codewords, respectively; and
      means for recovering at least a portion of the second signal responsive to at least one of the determined first and second sampling points.

50. A method of using a radiotelephone comprising the steps of:
   transmitting a first signal; and
   receiving a second signal including at least first and second codewords, further comprising the steps of:
      storing the second signal;
      determining first and second sampling points corresponding to the first and second codewords, respectively; and
      recovering at least a portion of the second signal responsive to at least one of the determined first and second sampling points.

* * * * *